United States Patent
Gallagher

(10) Patent No.: US 7,792,230 B1
(45) Date of Patent: Sep. 7, 2010

(54) REMOTE SYNCHRONIZATION OF EXTERNAL MAJORITY VOTING CIRCUITS

(75) Inventor: Timothy C. Gallagher, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 903 days.

(21) Appl. No.: 11/654,671

(22) Filed: Jan. 18, 2007

(51) Int. Cl.
*H04L 7/00* (2006.01)

(52) U.S. Cl. .................................................... 375/354

(58) Field of Classification Search ................ 375/142, 375/143, 150, 152, 343, 354, 357, 369, 372, 375/373, 374; 370/395.62, 507; 455/265; 702/89; 713/375, 400; 704/216, 218, 237, 704/263; 708/5, 422, 813; 342/108, 145, 342/189, 378
See application file for complete search history.

(56) References Cited

U.S. PATENT DOCUMENTS

| | | | |
|---|---|---|---|
| 7,394,710 B1 * | 7/2008 | Gallagher | 365/221 |
| 7,509,513 B2 * | 3/2009 | Toillon et al. | 713/375 |
| 7,590,090 B1 * | 9/2009 | Horn | 370/329 |
| 2006/0222017 A1 * | 10/2006 | Quiroga et al. | 370/503 |

* cited by examiner

*Primary Examiner*—Sam K Ahn
(74) *Attorney, Agent, or Firm*—McDermott Will & Emery LLP

(57) ABSTRACT

A system for remotely synchronizing a majority voter circuit. The system comprises a first processor for generating a data packet and a synchronization pulse wherein the synchronization pulse indicates a predetermined bit location in the data packet. The system further comprises a plurality of second processors communicatively coupled to the first processor. Each of the plurality of second processors has a register, and each of the plurality of second processors receives the data packet and the synchronization pulse, and stores the data packet and the synchronization pulse in its respective register. A voting processor is communicatively coupled to each of the plurality of second processors. The voting processor receives at least a portion of the data packet from each of the plurality of processors, and utilizes the synchronization pulse to align each of the received portions of the data packets, according to the synchronization pulse prior to voting.

15 Claims, 6 Drawing Sheets

---

410:
Generating a synchronization pulse associated with a bit location of a data packet at a first processor 420:
Transmitting the synchronization pulse and the data packet to a plurality of second processors wherein the data packet is stored in a respective register for each of the plurality of second processors 430:
Transmitting a portion of the data packet stored on each of the plurality of second processors to a voting processor wherein the voting processor utilizes the synchronization pulse to align each of the received portions of the data packets according to the synchronization pulse prior to voting 610:
Receiving a plurality of data packets from a plurality of data registers wherein each data packet has a plurality of bit locations for storing bits and further wherein each data packet is associated with a synchronization pulse that identifies one of the plurality of bit locations of the data packet 620:
Comparing the bits in the bit locations in each of the plurality of data packets with the respective bit locations in the other plurality of data packets to determine the correct bit for each of the bit locations wherein the comparing is based on the synchronization pulse 630:
Generating a network data packet comprising the correct bits and a word having a representation of the synchronization pulse

FIG. 6

REMOTE SYNCHRONIZATION OF EXTERNAL MAJORITY VOTING CIRCUITS

TECHNICAL FIELD

The present invention relates to fault tolerant systems, and in particular to a system and method for synchronizing of majority voting circuits used in fault tolerant systems.

BACKGROUND

Systems that are exposed to the harsh environments of space must be able to withstand extreme conditions operate correctly without losing any of their functions and capabilities. Specifically, space based systems must operate in an environment in which radiation has an adverse impact on integrated circuit operation.

Four potential problems may arise due to the effects of radiation. Three of these problems can permanently damage integrated circuits, while the fourth problem may be remedied.

First, total dose radiation caused by the cumulative effects of particles striking an integrated circuit can permanently damage that integrated circuit. Second, the radiation dose rate caused by burst radiation may permanently damage the integrated circuit. Third, displacement damage resulting from nuclear interactions, namely scattering that causes semiconductor defects, can cause permanent damage to integrated circuits. Fourth, single event upsets (SEU or SEUs) can cause a change of state (usually in a memory bit). SEUs do not, however, cause permanent damage.

SEUs occur when energetic particles deposit a charge into memory circuits, causing stored data to change state (i.e., from a "1" to a "0," or vice versa). As circuits shrink and transistor volumes become smaller, the total charge needed to cause an upset in a circuit element decreases. Thus, even protons moving through the circuit may deposit sufficient charge to disrupt sensitive locations.

The most common approach for correcting errors is to use triplicated-redundant information storage or error-checking circuitry. For example, a technique known as "voting logic" can be used to catch and correct potential errors in latches. With this technique, a single latch does not effect a change in bit state; rather, several identical latches are queried, and the state will only change if the majority of latches are in agreement. Thus, a single latch error will be "voted away" by the others.

The majority voting may be performed internal to a device and/or external to a device. Typically, the internal majority voting is simpler and can be executed at a low-level where the potential errors occur. The external majority voting can correct major errors that cannot typically be corrected by the internal majority voting. For example, a Single Event Functional Interrupt (SEFI), such as, device shutdown, loss of lock, loss of input/output or other disabling events are typically not corrected by the internal majority voting.

Generally, whether the majority voting is performed internal or external to the device, voting circuits require the implementation of an on-board low skew timing circuit, resulting in minimal clock skew between all the components. The voting logic compares for multiple clock differences between data streams from each of the triple-redundant data storage to determine if an error has occurred. In the event of an error, the voting logic must separately command the re-synchronization of the system.

As circuit speed increases, the margins necessary for low skew timing circuits decrease substantially. As a result, critical timing adjustments are required. These tight timing requirements limit the number of circuit boards that can be utilized in the system. In addition, the voter method of comparing multiple clock differences requires substantial internal circuitry for detecting voting errors, and for resynchronizing the system.

The present system and method solves these and other problems by providing, self-timing automatic synchronization. The present system also allows remote synchronization, through network based systems, without being affected by the number of boards or modules used in that system.

SUMMARY

According to one embodiment of the invention, a system is provided for remotely synchronizing a majority voter circuit. The system comprises a first processor for generating a data packet and a synchronization pulse wherein the synchronization pulse indicates a predetermined bit location in the data packet.

The system further comprises a plurality of second processors communicatively coupled to the first processor. Each of the plurality of second processors has a register, and each of the plurality of second processors receives the data packet and the synchronization pulse, and stores the data packet and the synchronization pulse in its respective register.

A voting processor is communicatively coupled to each of the plurality of second processors. The voting processor receives at least a portion of the data packet from each of the plurality of processors, and utilizes the synchronization pulse to align each of the received portions of the data packets, according to the synchronization pulse prior to voting.

In one aspect of the system of the invention, the plurality of second processors comprises three radiation hardened field programmable gate arrays, and the voting processor may be a majority voting circuit.

In another aspect of the system of the invention, the voting processor generates a first network data packet based on a majority vote of each of the received data packets from the plurality of second processors. As a result, the synchronization pulse is converted into a synchronization word in the first network data packet.

In another aspect of the system of the invention, the voting processor receives a second network data packet. The second network data packet includes a synchronization word that is representative of a second synchronization pulse.

In a still further aspect of the system of the invention, each of the plurality of second processors receives a portion of the second network data packet and the second synchronization pulse, and each stores the received portion of the second network data packet and the synchronization pulse in its respective register In yet another aspect of the invention, a second voting circuit is communicatively coupled to the plurality of second processors. The second voting processor receives at least a portion of the second network data packet from each of the plurality of processors, and utilizes the synchronization pulse to align each of the received portions of the second network data packets, according to the synchronization pulse prior to voting.

According to one aspect of the invention, a method is provided for remotely synchronizing a majority voter circuits. The method comprises generating a synchronization pulse associated with a bit location of a data packet at a first processor and transmitting the synchronization pulse and the data packet to a plurality of second processors, wherein the data packet is stored in a respective register for each of the plurality of second processors. The method further comprises transmitting a portion of the data packet stored on each of the plurality of second processors to a voting processor, wherein prior to voting, the voting processor aligns the portion of the received data packet based on the synchronization pulse.

In another aspect of the invention, the method further comprises the steps of generating a first network data packet based on a majority vote of each of the received portions of the data packets from the plurality of second processors and converting the synchronization pulse to a synchronization word in the first network data packet.

In yet another aspect of the invention, the method comprises the steps of receiving a second network data packet having a synchronization word representative of a second synchronization pulse and transmitting a portion of the second network data packet and the second synchronization pulse to the plurality of second processors. The method further comprises storing the received portion of the second network data packet and the synchronization pulse in a respective register of each of the plurality of second processors and transmitting a portion of the second network data and the synchronization pulse to a second voting processor. The second voting processor utilizes the synchronization pulse to align each of the received portions of the second network data packets according to the synchronization pulse prior to voting.

According to one aspect of the invention, a method is provided for remotely synchronizing a majority voter circuit. The method comprises receiving a plurality of data packets from a plurality of data registers, wherein each data packet has a plurality of bit locations for storing bits. Each data packet is associated with a synchronization pulse that identifies one of the plurality of bit locations of the data packet.

The bits in the bit location are compared in each of the plurality of data packets with the respective bit locations in the other plurality of data packets. This determines the correct bit for each of the bit locations. The comparisons are based on the synchronization pulse.

A network data packet is also generated, comprising the correct bits and a word having a representation of the synchronization pulse.

In another aspect of the method of the invention comprises the step of transmitting the network data packet to a switch.

A still further aspect of the method of the invention comprises the steps of receiving a second network data packet, wherein each data packet has a plurality of bit locations for storing bits; and converting the word having a representation of the synchronization pulse to a synchronization pulse.

Another aspect of the invention comprises the steps of transmitting a portion of the second network data packet and synchronization pulse to the plurality of data registers; transmitting the portion of the second network data packet and synchronization pulse from each of the plurality of data registers to a majority voting processer; comparing the bits in the bit locations in each of the portion of the second network data packets with the respective bit locations in the other plurality of second network data packets, to determine the correct bit for each of the bit locations wherein the comparing is based on the synchronization pulse; and generating a third network data packet comprising the correct bit for each bit location.

A still further aspect of the invention comprises using a first processor to generate the data packet and the synchronization pulse, and transmitting the data packet and the synchronization pulse to a plurality of data registers before the receiving step.

BRIEF DESCRIPTION OF THE DRAWINGS

FIG. 6 illustrates a method of remotely synchronizing a majority voter circuit in accordance with one aspect of the present disclosure.

DETAILED DESCRIPTION

Figure 1:
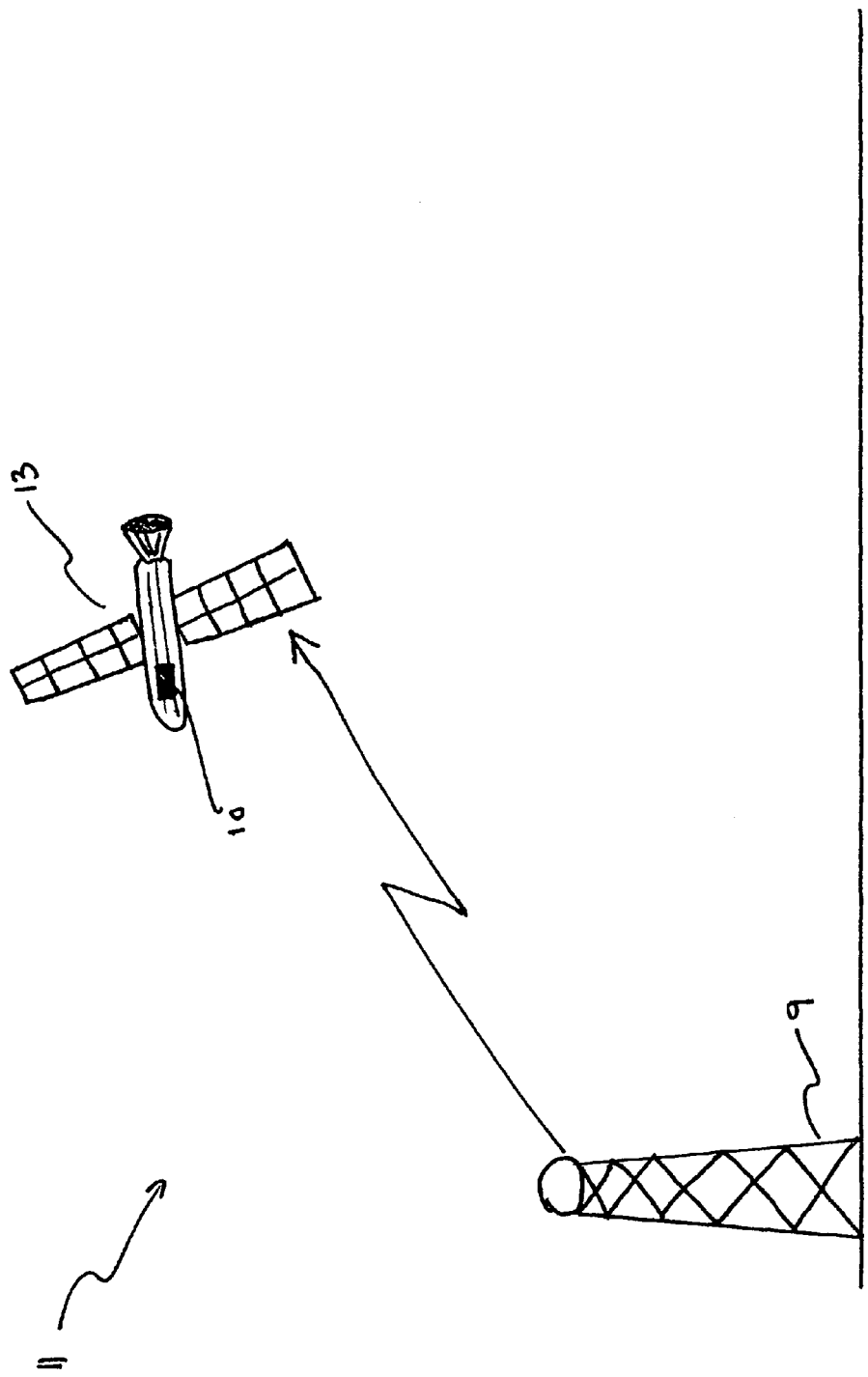
FIG. 1 illustrates a satellite system in accordance with an embodiment of the present invention.

While this invention is susceptible to embodiments in many different forms, there is shown in the drawings and will herein be described an example of the invention with the understanding that the present disclosure is to be considered as an exemplification of the principles of the invention and is not intended to limit the broad aspect of the invention to the examples illustrated.

The present invention generally relates to a system and method of synchronizing majority voting circuits that are used in fault tolerant systems. The system comprises a first processor that generates a synchronization pulse and a data packet that includes a plurality of bit locations. The synchronization pulse is utilized to indicate one of the plurality of bit locations. The system also comprises a plurality of second processors that are communicatively coupled to the first processor. Each of the plurality of second processors has a register, which is capable of storing data, such as the data in the data packet generated by the first processor. The first processor communicates the generated data packet and the synchronization pulse to each of the plurality of second processors. Each of the second processors receives the data packet and synchronization pulse and stores the data packet and synchronization pulse in its respective register. The system also comprises a voting processor that is communicatively coupled to each of the plurality of second processors. The voting processor receives a portion of each data packet from each of the registers and utilizes the synchronization pulse to align each of the received data packet portions prior to voting. The voting processor creates a network data packet based on the voting and also includes a representation of the synchronization pulse within the network data packet. The network data packet, which includes the representation of the synchronization pulse, is transmitted on to a network for processing. The representation of the pulse is used to align the data when it is sent to another majority voting circuit within the system.

FIG. 1 illustrates a satellite system 11 in which a fault tolerant integrated architecture 10 may be utilized. The satellite system 11 is comprised of one or more satellites 13 that are in communication with base stations 9 located on the Earth. A radio frequency (RF) signal having network data, such as audio or video data is transmitted from one of the base stations 9 on the Earth to a satellite 13 which processes the data and transmits the data to another base station 9 on the Earth or another satellite 13.

A brief overview of the components of the system of the invention will initially be provided. Details of these components, and of the operation of these components in connection with the method of the invention, will follow.

The invention is a system for remotely synchronizing a majority voter circuit. As may best be seen in FIG. 2, the system comprises a first processor 14, which may be stored on an Actel "ADC." The first processor 14, and the other processors described herein, can be a hardware component or multiple hardware components or circuitry, such as an integrated circuit, that executes a computer algorithm or part of a computer-based algorithm. The processor may contain a single or multiple arithmetic-logic units that perform arithmetic and logic operations. The terms processor and circuit are used interchangeably herein. In accordance with the method of the invention, this first processor 14 generates a synchronization pulse associated with a bit location of a data packet. The synchronization pulse indicates a predetermined bit location in that data packet.

The system further comprises a plurality of second processors. These second processors may be stored on a plurality of SRAM-based FPGAs 15. As may also be seen in FIG. 2, these SRAM-based FPGAs 15 include a first SRAM-based FPGA 16; a second SRAM-based FPGA 18; and a third SRAM-based FPGA 20. These FPGAs 16, 18, and 20 are communicatively coupled to the first processor 14. The plurality of second processors 16, 18, and 20 may be radiation hardened field programmable gate arrays.

Figure 2:
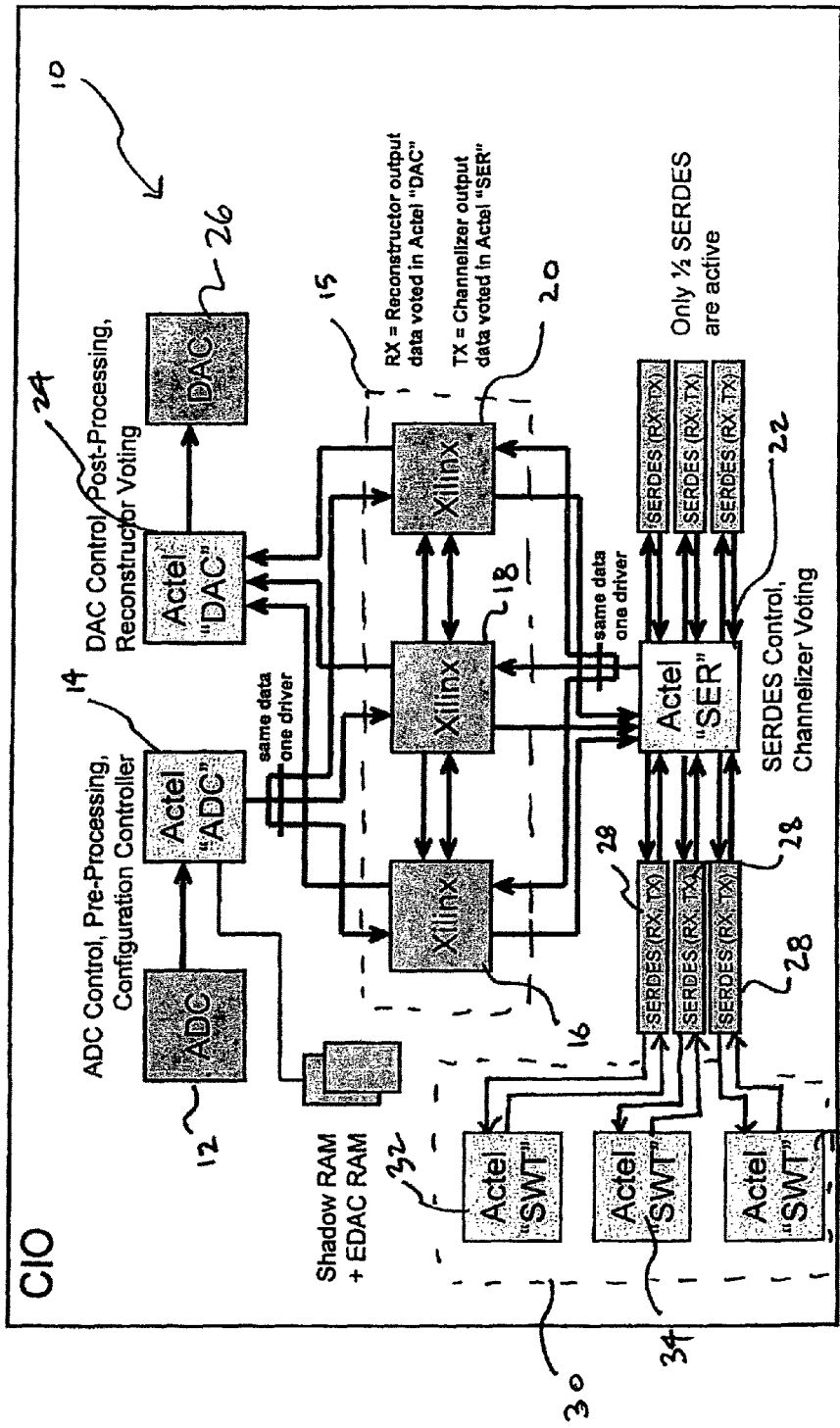
FIG. 2 illustrates a fault tolerant integrated architecture in accordance with an embodiment of the present invention.

Each of the plurality of second processors 16, 18, and 20 has a register. Each of the plurality of second processors 16, 18, and 20 receives the data packet and the synchronization pulse, and stores the data packet and the synchronization pulse in its respective register. FIG. 2 also shows a voting processor 22. The voting processor may be executed on an Actel "SER." This voting processor 22 is communicatively coupled to each of the plurality of second processors 16, 18, and 20.

The voting processor 22 receives at least a portion of the data packet from each of the plurality of second processors 16, 18, and 20. The voting processor 22 utilizes the synchronization pulse to align each of the received portions of the data packets, according to the synchronization pulse prior to voting. In one embodiment, the voting processor 22 may be a majority voting circuit.

The voting processor 22 generates a first network data packet, based on a majority vote of each of the received data packets from the plurality of second processors 16, 18, and 20. As a result, the synchronization pulse is converted into a synchronization word in the first network data packet. This first network data packet is transmitted to a plurality of SWT FPGAs 30. The voting processor 22 can also receive a second network data packet from the plurality of SWT FPGAs 30. The second network data packet includes a synchronization word that is representative of a second synchronization pulse.

Each of the plurality of second processors 16, 18, and 20 receives a portion of the second network data packet and the second synchronization pulse, and each stores the received portion of the second network data packet and the synchronization pulse in the respective register of each of the second processors 16, 18, and 20.

The system also includes a second voting circuit 24. This second voting circuit 24 is shown in FIG. 2 and may be an Actel "DAC.". This second voting circuit 24 is communicatively coupled to the plurality of second processors 16, 18, and 20. The second voting processor 24 receives at least a portion of the second network data packet from each of the plurality of second processors 16, 18, and 20. The second voting processor 24 utilizes the synchronization pulse to align each of the received portions of the second network data packets, according to the synchronization pulse prior to voting.

FIG. 2 depicts a preferred example of a fault tolerant integrated architecture 10 typically used in space satellite systems 11 or such other space based systems.

As a preferred example, the following description and the Figures discuss using a digital control unit coprocess input/output (DCU CIO) module 10 as a fault tolerant integrated circuit. It is contemplated, however, that other fault tolerant integrated circuits, as known to those of ordinary skill in the art, may also be used.

The DCU CIO 10 of FIG. 2 is designed to protect data from so-called single event upsets (SEU or SEUs). Such SEUs occurs when high energy particles, such as radiation from cosmic rays, pass through the DCU CIO 10 and causes errors. Such errors can include malfunctions, failures, or changed bits in the memory devices of the DCU CIO 10.

As mentioned above, in order to ensure its proper operation in these high-radiation environments, the DCU CIO 10 generally incorporates (a) radiation hardened triple redundant architecture and/or (b) SEU correction hardware, including external majority voter circuits.

Radiation hardening of the components in the DCU CIO module 10 can be effected by either physical or logical means. Physical radiation hardening is effected by manufacturing those components on insulating substrates, such as Silicon oxide (SOI) and sapphire (SOS). Physical radiation hardening with SOI or SOS substrates provides space-grade chips able to survive doses of radiation many orders of magnitude greater than the 5 to 10 krad doses of radiation that normal, commercial-grade chips can withstand.

In another example of physical radiation hardening, the substrate is formed with a relatively wide band gap. This relatively wide band gap provides a larger tolerance to potential deep-level effects. Finally, other methods of physical radiation hardening of components, as known to those of skill in the art, may also be used.

Logical radiation hardening of the components of the DCU CIO module 10 may also be employed. In this example, the DCU CIO 10 employs triple redundant storage of data, and a voting circuit to protect data from SEU. In this method, the DCU CIO 10 includes three or more registers, and a majority voter. Identical data is stored to each of the three registers. A voting circuit having voting logic analyzes and compares the three sets of data to each other, in order to determine the correct data values. The voting logic recognizes a single bit error, and ultimately corrects that error.

FIG. 2 depicts the many components of the DCU CIO module 10. The module 10 includes an analog-to-digital converter ("ADC") 12. The module 10 also includes an ADC Field-Programmable Gate Array (FPGA) 14, identified in FIG. 2 as an Actel "ADC." As discussed above, the module 10 further includes a plurality of static random access memory-based (SRAM-based) FPGAs 15, including second processors 16, 18, and 20. However, it is contemplated that any number of SRAM-based FPGAs 15 can be used.

The module further comprises a Serial FPGA (SER FPGA) 22; a digital-to-analog converter (Actel "DAC") FPGA, having a voting circuit 24; and another digital-to-analog converter DAC 26.

In addition, a serializer/deserializer (SERDES) 28 may be used to couple the DCU CIO module 10 to a plurality of SWT FPGAs 30, including a first SWT FPGAs 32, a second SWT FPGAs 34, and a third SWT FPGAs 36.

The DCU CIO 10 of the invention may be utilized in any one of a plurality of different band plans. A "band plan" uses a designated portion of the electromagnetic spectrum. The band plan generally defines the frequency range to be used by the DCU CIO 10. The band plan may optionally also define other criteria, including the numbering scheme, the center frequencies, the bandwidths and/or deviation, the spectral mask, the modulation scheme, the content permitted on the band frequency, and procedures required to obtain a license to use the frequency.

In one example, the DCU CIO module 10 is used in a 36 MHz band. The DCU CIO module 10 may also be used in a 8 MHz band, or a 4 MHz band. While this embodiment contemplates the use of the DCU CIO module 10 in 36 MHz, 8 MHz, and/or 4 MHz band plans, it should be understood that any number of band plans, as known to those of ordinary skill in the art, can also be used.

The DCU CIO module 10 permits fast and efficient synchronization of circuitry through the DCU CIO module 10 and the network to which the DCU CIO module 10 may be coupled. Typically, the DCU CIO module 10 includes a major synchronization pulse (also alternatively referred to as a "synchronization pulse") and a minor synchronization pulse (also referred to as a "second synchronization pulse").

The Actel "ADC" 14 of FIG. 2 generates the major synchronization pulse, and then transmits that major synchronization pulse to the plurality of SRAM-based FPGAs 15. The major synchronization pulses occur at defined intervals for each particular band plan, and maintain synchronization across the plurality of SRAM-based FPGAs 15.

The major and minor synchronization pulses are passed along with the data flow, allowing all the components to have known processing and recovery points. In addition, the major synchronization pulse synchronizes the multiple SRAM-based FPGAs 15, both during initial startup, and after reconfiguration.

As noted above, the DCU CIO module 10 includes an ADC 12. This ADC 12 receives an analog signal from a base station 9 located on Earth, or from another satellite. The ADC 12 converts the analog signal to a digital signal, and transmits the digital signal to the Actel ADC 14. This Actel ADC 14 is preferably a radiation-hardened FPGA, manufactured by Actel Co in Mountain View, Calif. However, other suitable radiation-hardened FPGAs may also be used.

The ADC 12 also receives voter errors from the SER FPGA 22 and the digital-to-analog converter (DAC) 24. The ADC 12 coordinates startup and shutdown of data flow, based on the voter errors. For example, after a voter error is received, the ADC 12 may reconfigure the SRAM-based FPGAs 15, and hold off on the voter channel.

After the ADC FPGA 14 processes the data received from the ADC interface 12, the ADC FPGA 14 transmits the data to the first SRAM-based FPGA 16, the second SRAM-based FPGA 18, and the third SRAM-based FPGA 20. Each of the SRAM-based FPGAs receives the identical data, and stores the data in respective memory registers (not shown). The data is subsequently placed in data packets, in accordance with a channelizer algorithm.

This channelizer algorithm is described in the assignee's co-pending U.S. patent application Ser. No. 11/708,040, entitled "Efficient High Bandwidth Networking Using Multilayered Routing". The disclosures of that co-pending application are incorporated herein by reference.

The ADC FPGA 14 also generates and transmits the major synchronization pulse to the SRAM-based FPGAs 16, 18, and 20. The SRAM-based FPGAs 15 typically define the band plan for each DCU CIO module 10. Therefore, the generation and transmission of the major synchronization pulse is based on the configuration of the SRAM-based FPGAs 15. In particular, the SRAM-based FPGAs 15 are the source for band plan-dependent configuration information, such as the synchronization values.

Each of the SRAM-based FPGAs 15 comprises two read-only SBC registers that provide synchronization information. The first SBC register is a sync-cycle register that defines the number of 140 MHz clock cycles per sync insertion on the ADC 14. The second SBC register is a Packet Info register which is used to control the number of packets generated by the SERDES 28 between major synchronizations. The values in each of the SBC registers are related. This is because the channelizer algorithm in the SRAM-based FPGAs 15 and the Reconstructor code in the SER FPGA 22 use common components, and the same SERDES packet format, to transfer data. The registers are also related because the output of the Channelizer is the input to the Reconstructor.

The SRAM-based FPGAs 15 and the SER FPGA 22 include internal logic to synchronize the cycle intervals, depending on the band plan. For example, the logic synchronizes at a 21 cycle interval for a 36 MHz band plan; a 112 cycle interval for a 8 MHz band plan; and a 224 cycle interval for a 4 MHz band plan. All band plans have been normalized to the 140 MHz clock domain.

The synchronization cycle is computed by determining the least common multiple (LCM) of the synchronization values for each band plan. For example, in the 36 MHz band plan, the LCM is 1134; in the 8 MHz band plan, the LCM is 336; and in the 4 MHz band plan, the LCM is 672.

In addition, because longer synchronization values have no adverse effect on the DCU CIO module 10, a value of 672 can be used for both the 4 and 8 MHz band plans. Therefore, 1134 and 672 may be the cycle count values used on the ADC 14 for major synchronization generation.

The Actel "ADC" FPGA 14 controls the major synchronization generation, based upon values stored in the sync-cycle register. Preferably, the major synchronization is generated using an 11-bit linear feedback shift register (LFSR) (not shown) by comparing the current LFSR value to a pre-selected value. In one example, the pre-selected value is 001h. As a result, the respective cycle count values 1134 and 672 discussed above are encoded into values based on the LFSR sequence. The encoded values are 4E4h and 6AFh, respectively.

The ADC FPGA 14 uses the encoded values to generate major synchronization bits at the 1134 or 672 rate. The same sync bit is transferred to all three SRAM-based FPGAs 15, and therefore allows each SRAM-based FPGA 16, 18, 20 to synchronize with the incoming data stream from the ADC FPGA 14.

Because the SRAM-based FPGAs synchronize the incoming data based on the major synchronization pulse, the SRAM-based FPGAs 15 are capable of allowing a one packet skew between the plurality of SRAM-based FPGAs 15.

Figure 3:
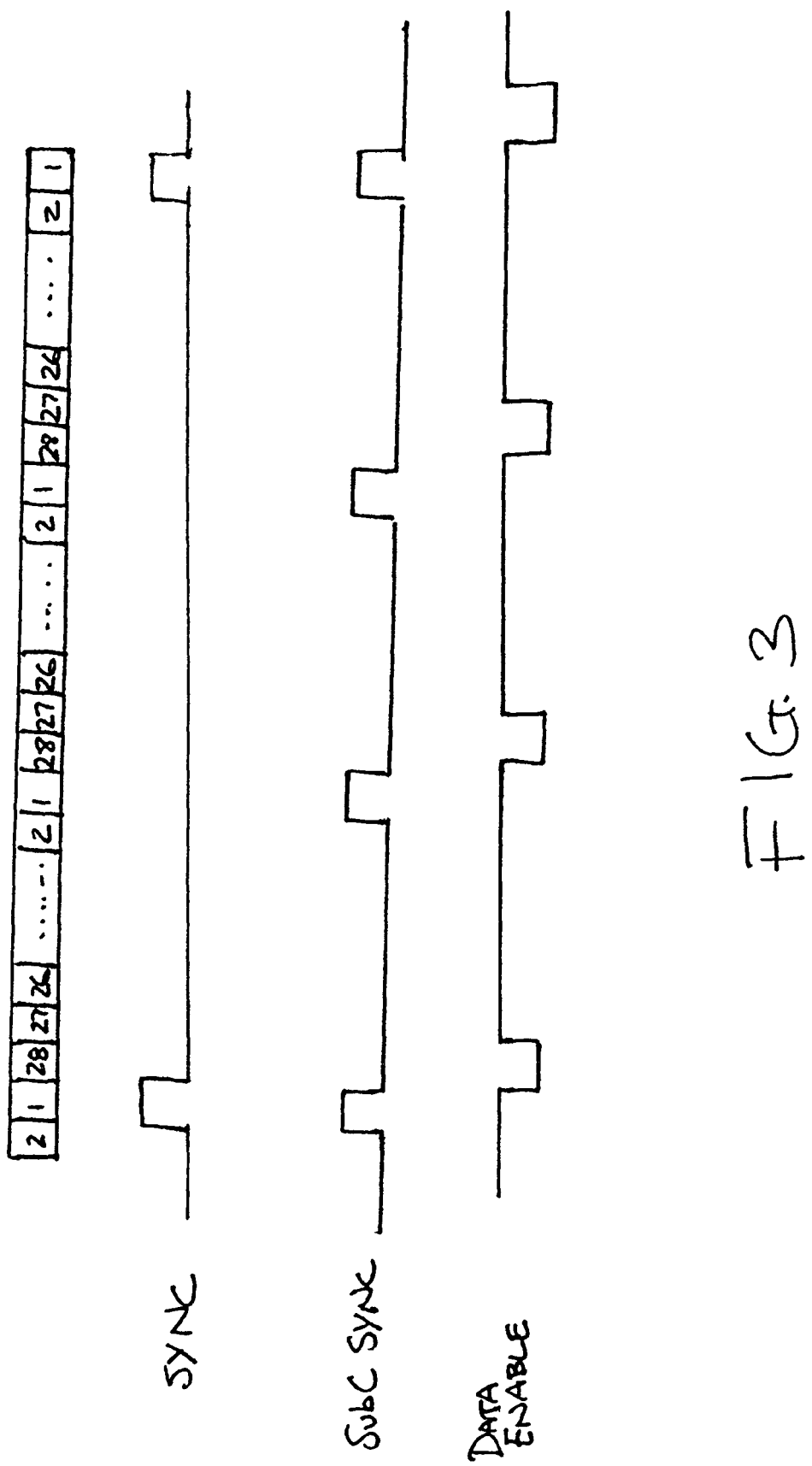
FIG. 3 illustrates a synchronization pulse in accordance with an embodiment of the present invention.

As noted above, each of the SRAM-based FPGAs 16, 18, and 20 receive identical data streams, and the major synchronization pulse, from the ADC FPGA 14. The received data is stored in the respective memory registers of each SRAM-based FPGA 16, 18, and 20. Each of the channelizers of the SRAM-based FPGAs 16, 18, 20 supplies up to 27 channels of 32-bit wide I/Q data in a defined sequence, along with the major synchronization pulse that can be used to detect the start of the sequence. Each SRAM-based FPGA 16, 18, 20 transmits a 16-bit wide data stream with a clock signal; a data valid signal; and, as illustrated in FIG. 3, a sync pulse indicating the first word of the packet to the SER FPGA 22.

The incoming major synchronization flows through the channelizer algorithm. At the output of the Channelizer, a sync is generated at a cycle rate which is used to identify the start of a time segment. The sync is stored in the FIFO associated with a XLXSER link A (not shown). The SRAM-based FPGAs 15 synchronizes the number of 140 MHz cycles needed to generate the data content for the three SER packets containing the data outputted from each respective SRAM-based FPGA 16, 18, 20. For example, 162 cycles are used the 36 MHz band plan, and 168 cycles are used for the 4 and 8 MHz band plans.

Each SRAM-based FPGA 16, 18, 20 includes a wrapper for converting the parallel I/Q sample data to a serial sample data. The wrapper includes a write side which writes data to a FIFO, and a read side which allows the SER FPGA 22 to read the data from the FIFO. Preferably, in the serial sample data, the I word is followed by the Q word. The wrapper also handles the transition from the 140 MHz domain of the SRAM-based FPGA 16, 18, 20 to the 100 MHz domain of the SER FPGA 22.

The wrapper re-synchronizes at the 162/168 cycle rate interval discussed above. During data writing (write side) to the FIFO, a 162/168 sync indicates the start of data that should be written to FIFO A (not shown).

An enable signal also is created by the Channelizer. That enable signal is generally considered accurate, as the overhead required to check the enable signal for validity has as much susceptibility to SEUs as the Channelizer logic that creates it. During the write side, the wrapper writes the appropriate number of words (based on the band plan) to FIFO A.

A counter is typically used to track the number of words that are written to the FIFO. Once the maximum number of words is written to the FIFO, subsequent data is written to the next FIFO, in circular order.

For example, when a major sync is received, the wrapper begins writing to the first FIFO, arbitrarily defined as FIFO A. After the maximum number of words is written to FIFO A, the data is written to the next FIFO. The write side processor may repeat past the 162/168 sync boundary, to handle any missing 162/168 syncs.

At the boundary of each packet, the write side of the wrapper transmits the addresses of the first entry for the last complete packet to the read side of the wrapper. The boundary typically arises at the same time that the 162/168 sync is generated.

The data crossing should preferably be properly conditioned for meta-stability issues. In one example, in order to assist with meta-stability issues, the FIFO in each of the SRAM-based FPGA 16, 18, 20 uses a separate address register, because the contents each of the plurality of SRAM-based FPGAs may not remain synchronized.

On the read side, once an address has been received for each FIFO, the SER FPGA 22 will begin reading data from each FIFO.

The logic for passing the address from the write side of the wrapper to the read side of the wrapper is similar to the manner in which the front end synchronizer of the SER FPGA 22 operates. As a result, it may be possible to adapt a portion of the front end synchronizer of the SER FPGA 22 to the requirements of the wrapper.

The above-described method of data writing and reading by the wrapper ensures that data corresponding to the 162/168 sync, derived from the major synchronization pulse, will be properly provided to the SER FPGA 22. The method of data writing also ensures that the read side of the wrapper remains in sync with the write side; this follows from the fact that both sides use the same address for the start of the packet.

The SER FPGA 22 receives the data stream from each of the SRAM-based FPGAs 15, and votes on the data to correct any error that may be caused by SEUs. The SER FPGA 22 uses the minor synchronization pulse to align data before the SER FPGA 22 votes on the data. The manner in which the SER FPGA 22 votes on the data is well-known to those of skill in the art.

Based on the voting, the SER FPGA 22 generates respective packets of data for transmission to the SWT FPGAs 30. The SER FPGA 22 assigns a packet header, generates an appropriate packet counter, and generates IDLE characters used in the outgoing SER packets.

In one example, the packet header is a 16-bit header with a pattern of 0xB5BC. The TK codes of the packet header are MSB of 0, and LSB of 1. The counter value allows for delays in the network, and is used to perform automatic resynchronization in case of a dropout Preferably, the packet counter is a one-up, 3-bit counter that uses FastEDAC encoding to produce 8 bits, and is duplicated in the upper and lower portion of the SER packets. The counter word uses a value of 0 for both the LSB and MSB of the TK code. The SER packet also includes 2 sets of a defined number of 16-bit data words, where each channel occupies two 16-bit words.

The data words also use a value of 0 for both the LSB and MSB of the TK code. Typically, the length of a SER packets is the defined number of 16-bit data words multiplied by two, plus five.

Each SRAM-based FPGA 16, 18, 20 also transmits the minor synchronization pulse to the SER FPGA 22 on each SERDES link 28 at the start of the data for each packet. The minor synchronization pulse is used to synchronize the voter on the side of the SER FPGA 22 responsible for receiving the data stream from each SRAM-based FPGA.

After voting, the minor synchronization pulse is converted to a SERDES start of frame (header) word such that it can remotely synchronize the receiving device, such as a second DCU CIO module (not shown).

The Actel SER 22 divides the ADC synchronization cycle count by the number of cycles, to generate the data content for the three SER data packets. For example, for the 36 MHz band plan, the Actel SER 22 will generate major synchronization pulses every 7 sets (1134/162=7). In contrast, for the 4 MHz and 8 MHz band plans, the SER 22 will generate major synchronization pulses every 4 sets (672/168=4).

In order to synchronize the data that will be processed by each of the SWT FPGAs, a packet number ranging from 0-7 is generated by the SER FPGA 22. Preferably, the packet number is encoded using FastEDAC coding, or such other similar coding schemes, and is stored in both the upper and lower bytes of the SERDES data word. The data stream transmitted from the SER FPGA 22 to each of the SWT FPGAs includes the header, the counter word, and the appropriate number of data words based on band plan.

The SER FPGA 22 transmits the SER packet to the SWT FPGA 30 over the SERDES link 28. As indicated in FIG. 2, preferably, each SER FPGA 22 supports three active SERDES links 28, and includes three inactive SERDES links 28. The data received from each of the SRAM-based FPGAs 15 by the SER FPGA 22 is transferred directly to the three serial links 28 after voting.

Preferably, the SERDES 28 is a serializer/deserializer which is an integrated circuit transceiver that converts parallel data to serial data, and vice-versa. The transmitter portion is a serial-to-parallel converter, and the receiver is a parallel-to-serial converter.

Each of three Actel "SWT" units 32, 34, and 36 of the FPGA 30 receives one-third of the total system data from the SER FPGA 22, and stores the counter word generated by each respective SER FPGA 22 with the data packet received from that SER FPGA 22.

Each SWT 32, 34, and 36 of the FPGA 30 replicates the incoming data stream, and performs the steps needed for the data selection required to produce the appropriate output packets. The SER FPGA 22 returns the counter word to the output packet, and transmits the output packet to the SER FPGA 22 over the serial link. The output packet may be transmitted to the SER FPGA 22 in DCU CIO 10 shown in FIG. 2, or a SER FPGA in another DCU CIO (not shown). Preferably, each SWT 32, 34, and 36 of the FPGA 30 supports four active SERDES links, one to each I/O port.

The SER FPGA 22 receives the output packet from each of the SWT FPGAs 30 and removes the packet header and replaces it with a minor synchronization pulse on the packet counter. Preferably, at a predetermined rate specified by the Packet Info register, the SER FPGA 22 modifies the counter word to also contain a major synchronization pulse.

The lower 8 bits are left unmodified, and retain the original counter value. For the upper 8 bits, a value of C0h denotes a major synchronization and value of 00h denotes that the packet is not a major synchronization. In one example, the major synchronization pulse is generated every seven packets. Therefore, in order to generate the major synchronization every seven packets, the value stored in the Packet Info register is 6 because the register stores the number of packets between major syncs. Therefore, a value of six is used for a 36 MHz band plan, and a value of 3 is used for 4 MHz and 8 MHz band plans. The SER FPGA transmits identical 16-bit wide data stream with a clock signal, a data valid signal, and the major synchronization indicating the first word of the packet to each of the SRAM-based FPGAs 16, 18, 20.

Each SRAM-based FPGA 16, 18, 20 receives the minor synchronization aligned with each packet counter word. Typically, the upper 8 bits of the counter are used to determine if a major synchronization should be stored for the packet. Preferably, each packet is stored into addressable buffers based on the count value.

If one packet is missing, then it is ignored and does not effect any other stored data. The major synchronization is received and is stored in the block random access memory (BRAM) (not shown) for all data received from a particular SWT FPGA 32, 34, or 36. The lower bit is used to access the packet counter word on each SRAM-based FPGA 16, 18, 20.

The counter is used to determine the location in the BRAM of the data for the respective packet, and where it will be stored. The counter is also used to synchronize the stored data.

On the read side, when the major synchronization is indicated while reading from the BRAM, the wrapper on the SRAM-based FPGAs 16, 18, 20 generates a major synchronization, to feed in to the Reconstructor of the SRAM-based FPGAs 16, 18, 20.

The incoming major synchronization flows through the Reconstructor, and is used to generate an outgoing minor synchronization pulse for the DAC FPGA 24. Preferably, the rate of the minor synchronization pulse is 81 clock cycles for the 36 MHz band plan, and 84 cycles for the 4 MHz and the 8 MHz band plans.

The DAC 24 receives a data packet and the minor synchronization pulse from each of the SRAM-based FPGAs 16, 18, 20. The DAC FPGA 24 aligns the data based on the minor synchronization, and votes on the data to eliminate single event upset effects.

Because the DAC FPGA 24 aligns the data based on the major synchronization pulse, the system can allow for a one packet (i.e., 104×16-bit words) skew between the plurality of SRAM-based FPGAs 15.

After the DAC FPGA 24 votes on the data, the synchronization is discarded and the data is converted to an analog signal to be transmitted to the DAC 26 for down-linking to a base station 9 or another satellite.

Figure 4:
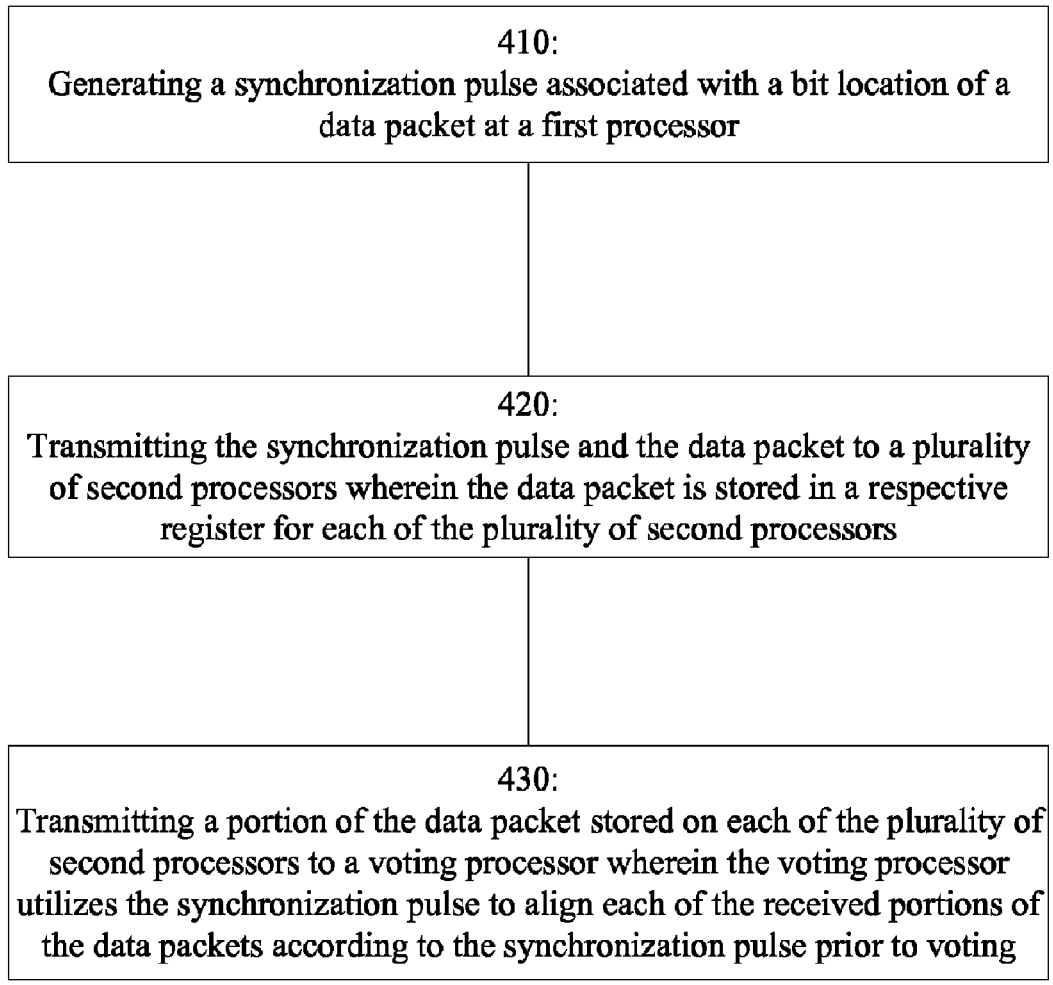
FIG. 4 illustrates a method of remotely synchronizing a majority voter circuit in accordance with one aspect of the present disclosure.

FIG. 4 illustrates a method of remotely synchronizing a majority voter circuit in accordance with one aspect of the present disclosure. The method shown in FIG. 4 may include an operation 410 for generating a synchronization pulse associated with a bit location of a data packet at a first processor and an operation 420 for transmitting the synchronization pulse and the data packet to a plurality of second processors wherein the data packet is stored in a respective register for each of the plurality of second processors. The method may also include an operation 430 for transmitting a portion of the data packet stored on each of the plurality of second processors to a voting processor wherein the voting processor utilizes the synchronization pulse to align each of the received portions of the data packets according to the synchronization pulse prior to voting.

Figure 5:
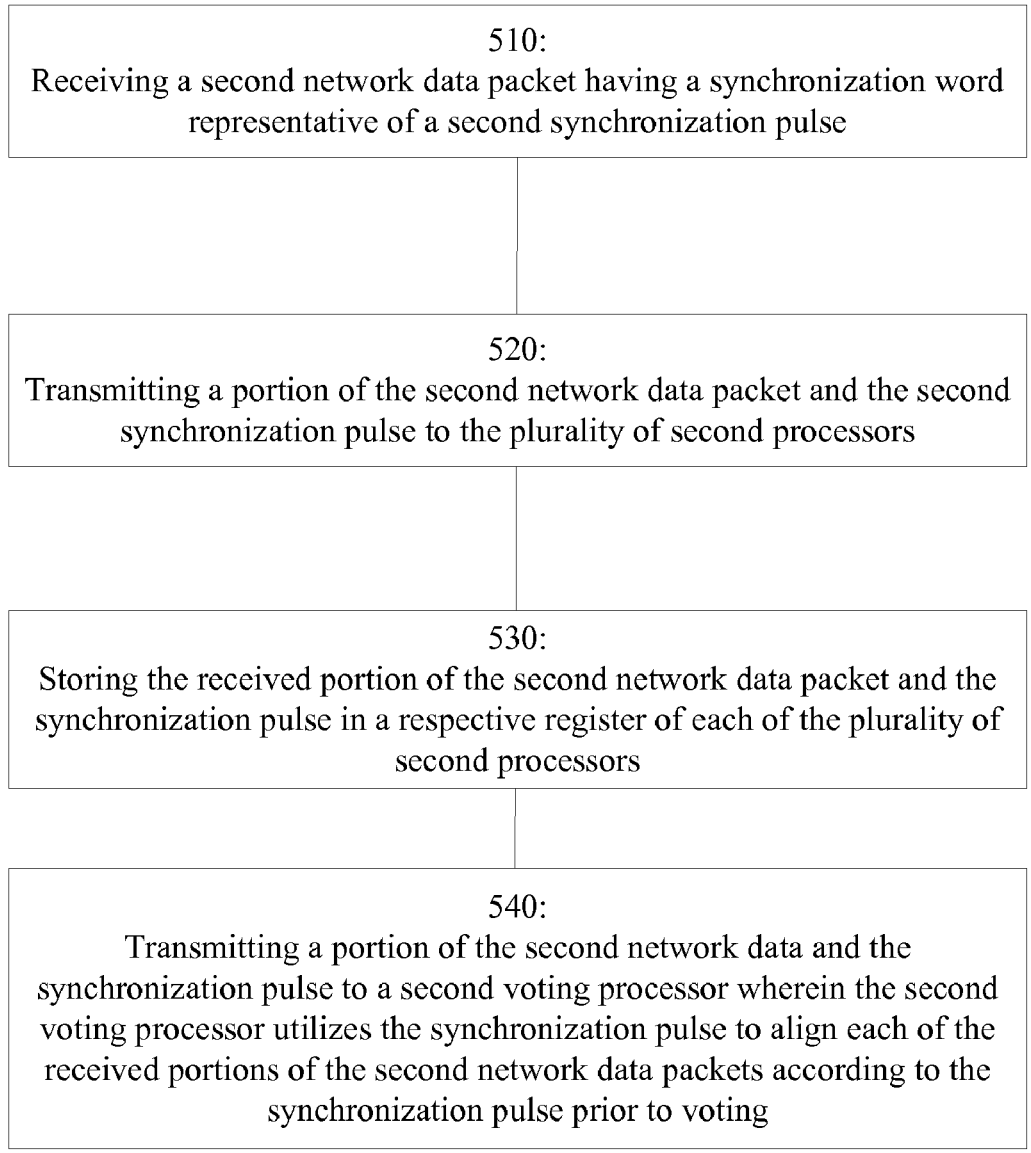
FIG. 5 illustrates a further method of remotely synchronizing a majority voter circuit in accordance with one aspect of the present disclosure.

The method shown in FIG. 4 may further include the operations shown in FIG. 5. The method shown in FIG. 5 may include an operation 510 for receiving a second network data packet having a synchronization word representative of a second synchronization pulse and an operation 520 for transmitting a portion of the second network data packet and the second synchronization pulse to the plurality of second processors. The method may also include an operation 530 for storing the received portion of the second network data packet and the synchronization pulse in a respective register of each of the plurality of second processors. The method may also include an operation 540 for transmitting a portion of the second network data and the synchronization pulse to a second voting processor wherein the second voting processor utilizes the synchronization pulse to align each of the received portions of the second network data packets according to the synchronization pulse prior to voting.

FIG. 6 illustrates a method of remotely synchronizing a majority voter circuit in accordance with one aspect of the present disclosure. The method may include an operation 610 for receiving a plurality of data packets from a plurality of data registers wherein each data packet has a plurality of bit locations for storing bits and further wherein each data packet is associated with a synchronization pulse that identifies one of the plurality of bit locations of the data packet. The method may also include an operation 620 for comparing the bits in the bit locations in each of the plurality of data packets with the respective bit locations in the other plurality of data packets to determine the correct bit for each of the bit locations wherein the comparing is based on the synchronization pulse. The method may further include an operation 630 for generating a network data packet comprising the correct bits and a word having a representation of the synchronization pulse.

This specification describes what the inventors consider to be the best mode of the invention. It should be understood that various modifications to the examples described in the specification may be implemented, which modifications could be used in other environments and settings, that would still come within the scope of the invention.

In addition, those of ordinary skill in that art will recognize that the disclosed aspects of the invention could be altered or amended, without departing from the spirit and scope of the invention. Thus, the subject matter of the invention is not intended to be limited to the specific details, exhibits and illustrated examples in this description. It is instead intended to protect any modifications and variations that fall within the scope of the advantageous concepts disclosed in this specification.

I claim:

1. A system for remotely synchronizing a majority voter circuit, the system comprising:
   a first processor for generating a data packet and a synchronization pulse wherein the synchronization pulse indicates a predetermined bit location in the data packet;
   a plurality of second processors communicatively coupled to the first processor wherein each of the plurality of second processors has a register, further wherein each of the plurality of second processors is configured for receiving the data packet and the synchronization pulse and storing the data packet and the synchronization pulse in its respective register; and
   a voting processor communicatively coupled to each of the plurality of second processors wherein the voting processor is configured for receiving at least a portion of the data packet from each of the plurality of second processors and utilizing the synchronization pulse to align each of the received portions of the data packets according to the synchronization pulse prior to voting.

2. The system of claim 1 wherein the plurality of second processors comprises three radiation hardened field programmable gate arrays.

3. The system of claim 1 wherein the voting processor is a majority voting circuit.

4. The system of claim 1 wherein the voting processor is configured for generating a first network data packet based on a majority vote of each of the received data packets from the plurality of second processors, wherein the synchronization pulse is converted to a synchronization word in the first network data packet.

5. The system of claim 1 wherein the voting processor is configured for receiving a second network data packet, wherein the second network data packet includes a synchronization word representative of a second synchronization pulse.

6. The system of claim 5 wherein each of the plurality of second processors is configured for receiving a portion of the second network data packet and the second synchronization pulse and each is configured for storing the received portion of the second network data packet and the synchronization pulse in its respective register.

7. The system of claim 6 further comprising a second voting circuit communicatively coupled to the plurality of second processors wherein the second voting processor is configured for receiving at least a portion of the second network data packet from each of the plurality of second processors and utilizing the synchronization pulse to align each of the received portions of the second network data packets according to the synchronization pulse prior to voting.

8. A method of remotely synchronizing a majority voter circuit, the method comprising:
   generating a synchronization pulse associated with a bit location of a data packet at a first processor;
   transmitting the synchronization pulse and the data packet to a plurality of second processors wherein the data packet is stored in a respective register for each of the plurality of second processors; and
   transmitting a portion of the data packet stored on each of the plurality of second processors to a voting processor wherein prior to voting, the voting processor aligns each of the portion of the data packet from each of the plurality of second processors based on the synchronization pulse.

9. The method of claim 8 further comprising the steps of:
   generating a first network data packet based on a majority vote of each of the portion of the data packet from each of the plurality of second processors; and
   converting the synchronization pulse to a synchronization word in the first network data packet.

10. The method of claim 8 further comprising the steps of:
    receiving a second network data packet having a synchronization word representative of a second synchronization pulse;
    transmitting a portion of the second network data packet and the second synchronization pulse to the plurality of second processors;
    storing the received portion of the second network data packet and the synchronization pulse in a respective register of each of the plurality of second processors; and
    transmitting a portion of the second network data packet and the synchronization pulse to a second voting processor wherein the second voting processor utilizes the synchronization pulse to align each of the portion of the second network data packet from each of the plurality of second processors according to the synchronization pulse prior to voting.

11. A method of remotely synchronizing a majority voter circuit, the method comprising:
    receiving a plurality of data packets from a plurality of data registers wherein each data packet has a plurality of bit locations for storing bits and further wherein each data packet is associated with a synchronization pulse that identifies one of the plurality of bit locations of the data packet;
    comparing the bits in the bit locations in each of the plurality of data packets with the respective bit locations in the other plurality of data packets to determine the correct bit for each of the bit locations wherein the comparing is based on the synchronization pulse; and
    generating a network data packet comprising the correct bits and a word having a representation of the synchronization pulse.

12. The method of claim 11 further comprising the step of transmitting the network data packet to a switch.

13. The method of claim 11 further comprising the steps of:
    receiving a second network data packet wherein each data packet has a plurality of bit locations for storing bits; and
    converting the word having a representation of the synchronization pulse to a synchronization pulse.

14. The method of claim 13 further comprising the steps of:
    transmitting a portion of the second network data packet and synchronization pulse to the plurality of data registers;
    transmitting the portion of the second network data packet and synchronization pulse from each of the plurality of data registers to a majority voting processor;
    comparing the bits in the bit locations in each of the portion of the second network data packets with the respective bit locations in the other plurality of second network data packets to determine the correct bit for each of the bit locations wherein the comparing is based on the synchronization pulse; and
    generating a third network data packet comprising the correct bit for each bit location.

15. The method of claim 11 wherein a first processor generates the data packet and the synchronization pulse and transmits the data packet and the synchronization pulse to a plurality of data registers before the step of receiving.

* * * * *